(12) United States Patent
Huang et al.

(10) Patent No.: US 12,031,712 B1
(45) Date of Patent: Jul. 9, 2024

(54) FAN LAMP AND FAN LAMP CONTROLLER

(71) Applicant: Shenzhen Yuhao Electronic Technology Co., Ltd., Shenzhen (CN)

(72) Inventors: Haiquan Huang, Shenzhen (CN); Shouping Li, Shenzhen (CN)

( * ) Notice: Subject to any disclaimer, the term of this patent is extended or adjusted under 35 U.S.C. 154(b) by 0 days.

(21) Appl. No.: 18/446,388

(22) Filed: Aug. 8, 2023

(30) Foreign Application Priority Data

Jul. 14, 2023 (CN) .......................... 202310871847.6

(51) Int. Cl.
| | | |
|---|---|---|
| *F21V 33/00* | (2006.01) | |
| *F04D 19/00* | (2006.01) | |
| *F04D 25/06* | (2006.01) | |
| *F04D 25/08* | (2006.01) | |
| *F04D 27/00* | (2006.01) | |
| *F21S 8/04* | (2006.01) | |
| *F21V 23/00* | (2015.01) | |
| *H02P 6/08* | (2016.01) | |
| *H05B 47/195* | (2020.01) | |

(52) U.S. Cl.
CPC ........ *F21V 33/0096* (2013.01); *F04D 19/005* (2013.01); *F04D 25/06* (2013.01); *F04D 25/088* (2013.01); *F04D 27/004* (2013.01); *F21S 8/04* (2013.01); *F21V 23/003* (2013.01); *H02P 6/08* (2013.01); *H05B 47/195* (2020.01); *Y02B 30/70* (2013.01)

(58) Field of Classification Search
CPC .... F04D 25/088; F04D 27/004; F04D 27/008; F04D 25/06; F04D 19/005; H05B 47/19; H05B 47/195; Y02B 30/70; H02P 6/08; F21V 33/0096; F21V 23/003; F21S 8/04
See application file for complete search history.

(56) References Cited

U.S. PATENT DOCUMENTS

| | | | |
|---|---|---|---|
| 10,954,948 B1 * | 3/2021 | Lowe .................. | F04D 25/0606 |
| 11,028,854 B2 * | 6/2021 | Stefankiewicz ....... | G08C 17/02 |
| 2015/0325112 A1 * | 11/2015 | McPherson ............ | G08C 17/02 |
| | | | 455/419 |
| 2018/0017273 A1 * | 1/2018 | Lin ....................... | G05B 19/048 |

* cited by examiner

*Primary Examiner* — Peter J Bertheaud

(57) ABSTRACT

The present disclosure discloses a fan lamp and a fan lamp controller. The fan lamp includes a fan module, which includes at least one fan. Each of the fans includes a fan main body and a direct-current brushless motor. The lighting module includes at least one lighting lamp. A switch unit includes at least two control switches. A signal conversion unit, electrically connected to the switch unit and configured to receive the switching signals of the at least two control switches and generate corresponding digital control signals. And a fan lamp controller, electrically connected to the direct-current brushless motor, the lighting lamp, and the signal conversion unit and configured to receive the digital control signals, generate a fan driving signal and a lighting control signal according to the digital control signals. The fan lamp has relatively high reliability.

13 Claims, 7 Drawing Sheets

FAN LAMP AND FAN LAMP CONTROLLER

CROSS-REFERENCE TO RELATED APPLICATIONS

The application claims priority of Chinese patent application 2023108718476, filed on 2023 Jul. 14, which is incorporated herein by reference in its entireties.

TECHNICAL FIELD

The present disclosure relates to the technical field of fan lamps, and particularly to a fan lamp and a fan lamp controller.

BACKGROUND

In a traditional fan lamp, a fan is mostly controlled by a zipper switch. For example, a multi-gear multi-contact high-current (AC250V10A) zipper switch to perform powering on, powering off, and speed adjustment control on an alternating-current driving motor of a fan. At the same time, the above zipper switch has high costs and short electrical performance life (it is used for 30,000 to 50,000 times regularly). At present, in order to reduce the power consumption and improve the stability, a fan in a fan lamp has gradually adopt a direct-current brushless motor. However, the original zipper switch usually cannot meet the requirement of switching between clockwise rotation and anticlockwise rotation of the motor, and cannot meet the requirement of freely formulating a speed of each gear. Further, a lighting lamp of a traditional fan lamp also adopts a zipper switch. If another zipper switch is used to control the lighting lamp to be turned on and turned off, and the another zipper switch also has the problems of high costs and short electrical performance life (it is used for 30,000 to 50,000 times regularly), the requirement of energy-saving dimming cannot be achieved.

SUMMARY

To improve the above problems, the present disclosure discloses a fan lamp and a fan lamp controller.

The fan lamp includes: a fan module, including at least one fan, wherein each of the fans includes a fan main body and a direct-current brushless motor; the direct-current brushless motor is connected to the fan main body and is configured to drive the fan main body to rotate; a lighting module, including at least one lighting lamp; a switch unit, including at least two control switches, wherein each of the control switches is configured to be triggered to generate a corresponding switching signal; a signal conversion unit, electrically connected to the switch unit and configured to receive the switching signals of the at least two control switches and generate corresponding digital control signals; and a fan lamp controller, electrically connected to the direct-current brushless motor, the lighting lamp, and the signal conversion unit and configured to receive the digital control signals, generate a fan driving signal and a lighting control signal according to the digital control signals, provide the fan driving signal to the direct-current brushless motor to control turning on, turning off, a rotating direction, a speed and/or rotation time of each of the fans, and provide the lighting control signal to the lighting module to control turning on, turning off, brightness, a color temperature and/or lightening time of each of the lighting lamps.

Further, the at least two control switches include a first control switch and a second control switch; the first control switch corresponds to one of the fans; the second control switch corresponds to one of the lighting lamps; the digital control signals include a first digital control signal and a second digital control signal; the signal conversion unit is configured to convert the switching signal of the first control switch into the first digital control signal; the fan lamp controller is configured to output the corresponding fan driving signal to the direct-current brushless motor of the corresponding fan according to the first digital control signal; the signal conversion unit is configured to convert the switching signal of the second control switch into the second digital control signal; and the fan lamp controller is configured to output the corresponding lighting control signal to the corresponding lighting lamp according to the second digital control signal.

Further, a quantity of the at least one fan is at least two; a quantity of the at least one lighting lamp corresponds to the quantity of the at least one fan, and each of the fans and the corresponding lighting lamp form a fan lamp group; the at least one fan and the at least one lighting module form two fan lamp groups; the digital control signals include at least two digital control sub-signals corresponding to the at least two fan lamp groups; the fan driving signal includes at least two fan driving sub-signals corresponding to the at least two fan lamp groups; the lighting control signal includes at least two lighting control sub-signals corresponding to the at least two fan lamp groups; the at least two control switches respectively correspond to the at least two fan lamp groups; the signal conversion unit is configured to convert the switching signal of each of the control switches into the corresponding digital control sub-signal; and the fan lamp controller is configured to respectively output the corresponding fan driving sub-signals and the corresponding lighting control sub-signals to the corresponding fans of the fan module and the corresponding lighting lamps of the lighting module according to the digital control sub-signals.

Further, the control switch is one of a Zipper switch and a touch switch; when a triggering duration of the control switches is shorter than first preset time, the switching signals generated by the control switches are on signals or off signals, and the on signals and the off signals appear alternately; and when the triggering duration of the control switches exceeds second preset time, the switching signals generated by the control switches are signals used for controlling the rotating directions, speeds and/or rotation time of the corresponding fans, or signals used for controlling the brightness, the color temperatures and/or the lightening time of the corresponding lighting lamps.

Further, the fan lamp further includes an alternating-current to direct-current conversion module and a direct-current conversion module; the fan lamp controller includes a main control module and a three-phase driving circuit; the alternating-current to direct-current conversion module is configured to receive an external direct current and convert the alternating current into a first direct-current voltage; the direct-current conversion module is electrically connected to the alternating-current to direct-current conversion module and the main control module; the direct-current conversion module is configured to convert the first direct-current voltage into a second direct-current voltage; the first direct-current voltage and the second direct-current voltage are provided to the main control module; the main control module is electrically connected to the signal conversion unit to receive the digital control signals; the fan driving signals include three fan driving sub-signals; the three-phase driving circuit is electrically connected between the main control module and the direct-current brushless motor; and the main control module is configured to output a three-phase control signal to the three-phase driving circuit according to the digital control signals, so that the three-phase driving circuit outputs the three fan driving sub-signals respectively to three receiving terminals of the direct-current brushless motor.

Further, the alternating-current to direct-current conversion module includes a common mode anti-interference module and a rectification module; the external alternating current is alternating-current mains supply; the common mode anti-interference module is configured to perform anti-interference treatment on the alternating-current mains supply to improve electromagnetic interference; the alternating-current mains supply with improved electromagnetic interference is provided to the rectification module; and the rectification module is configured to convert the alternating-current mains supply into the first direct-current voltage.

Further, the lighting module further includes a lighting control module and a lighting lamp driver; the lighting control module is electrically connected to the fan lamp controller and is configured to provide the external alternating current to the lighting lamp driver under the control of the fan lamp controller; the lighting lamp driver is electrically connected to the fan lamp controller, the lighting lamps, and the lighting control module, so as to receive the lighting lamp control signals and the external alternating current to output lighting driving signals to control the turning on, turning off, brightness, color temperatures and/or lightening time of the lighting lamps; the lighting control module includes a relay and a lighting switch; two input ends of the relay are configured to receive the external alternating current; two output ends of the relay are configured to output the external alternating current to the lighting lamp driver; a power end of the relay receives a working voltage; a ground end of the relay is grounded via two conducting ends of the lighting switch; and a control end of the relay is electrically connected to the fan lamp controller.

Further, the direct-current conversion module includes a first conversion unit and a second conversion unit; the first conversion unit is connected between the alternating-current to direct-current conversion module and the second conversion unit; the second conversion unit is connected between the first conversion unit and the main control module; the first conversion unit is configured to convert the first direct-current voltage into a third direct-current voltage; the second conversion unit is configured to convert the third direct-current voltage into the second direct-current voltage; the direct-current conversion module further includes a third conversion unit and the fourth conversion unit; the third conversion unit is connected between the first conversion unit and the fourth conversion unit; the third conversion unit is configured to convert the third direct-current voltage into a fourth direct-current voltage; the fourth conversion unit is configured to convert the fourth direct-current voltage into a fifth direct-current voltage; the second direct-current voltage is 15 V; the third direct-current voltage is 18 V; the fourth direct-current voltage is 5 V; and the fifth direct-current voltage is 3.3 V.

Further, the signal conversion unit includes a control chip; the control chip includes a power end VDD, a ground end, at least two switching signal receiving ends, and a digital control signal output end; the at least two switching signal receiving ends correspond to the at least two control switches; each switching signal receiving end is configured to receive the switching signal of the corresponding control switch; the digital control signal output end is configured to output the digital control signals; the power end VDD and the ground end GND are respectively configured to receive the working voltage and be grounded; the fan lamp further includes an operation feedback unit; the operation feedback unit is configured to send a feedback signal to make a feedback on operations received by the control switches; the operation feedback unit includes a switch element and a signal feedback element; the signal feedback element includes a buzzer or an indicator; the control chip further includes an operation feedback control end; the switch element and the signal feedback element are connected in series to form a series branch; one end of the series branch is configured to receive the working voltage; the other end of the series branch is configured to be grounded; and a control end of the switch element is electrically connected to the operation feedback control end.

The present disclosure also provides a fan lamp controller, applied to a fan lamp, wherein the fan lamp includes a fan module, a lighting module, a switch unit, and a signal conversion unit; the fan module includes at least one fan; each of the fans includes a fan main body and a direct-current brushless motor; the direct-current brushless motor is connected to the fan main body and is configured to drive the fan main body to rotate; the lighting module includes at least one lighting lamp; the switch unit includes at least two control switches; each of the control switches is configured to be triggered to generate a corresponding switching signal; the signal conversion unit is electrically connected to the switch unit and configured to receive the switching signals of the at least two control switches and generate corresponding digital control signals; and the fan lamp controller is electrically connected to the direct-current brushless motor, the lighting lamp, and the signal conversion unit and configured to receive the digital control signals, generate a fan driving signal and a lighting control signal according to the digital control signals, provide the fan driving signal to the direct-current brushless motor to control turning on, turning off, a rotating direction, a speed and/or rotation time of each of the fans, and provide the lighting control signal to the lighting module to control turning on, turning off, brightness, a color temperature and/or lightening time of each of the lighting lamps.

Compared with the prior art, the fan lamp of the above embodiment is as follows: Each of the fans adopts the direct-current brushless motor, the signal conversion unit converts the switching signals of the control switches into the digital control signals, so that the fan lamp controller can control rotations of the fans according to the digital control signals (for example, achieving control and a timer function of gears, clockwise rotations, and anticlockwise rotations of the fans). One-gear one-contact low current (for example, 250V0.1 A) is enough for the control switches used. In this way, the mechanical and electrical performance life of the control switches that control the fans can be effectively prolonged, for example, by 10 times (the control switches can be used for 500,000 times regularly). Similarly, for the lighting lamp portion, a traditional high-voltage mercury lamp is replaced with a light-emitting diode (LED). The signal conversion unit converts the switching signals of the control switches into the digital control signals, so that the fan lamp controller can control the turning on, turning off, brightness, color temperatures and/or lightening time of the lighting lamps according to the digital control signals. In this way, one-gear one-contact low current (for example, 250V0.1 A) is enough for the control switches used by the lighting lamps. In this way, the mechanical and electrical performance life of the control switches that control the lighting lamps can be effectively prolonged, for example, by 10 times (the control switches can be used for 500,000 times regularly), so that the fan lamp has relatively high reliability.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

Figure 1:
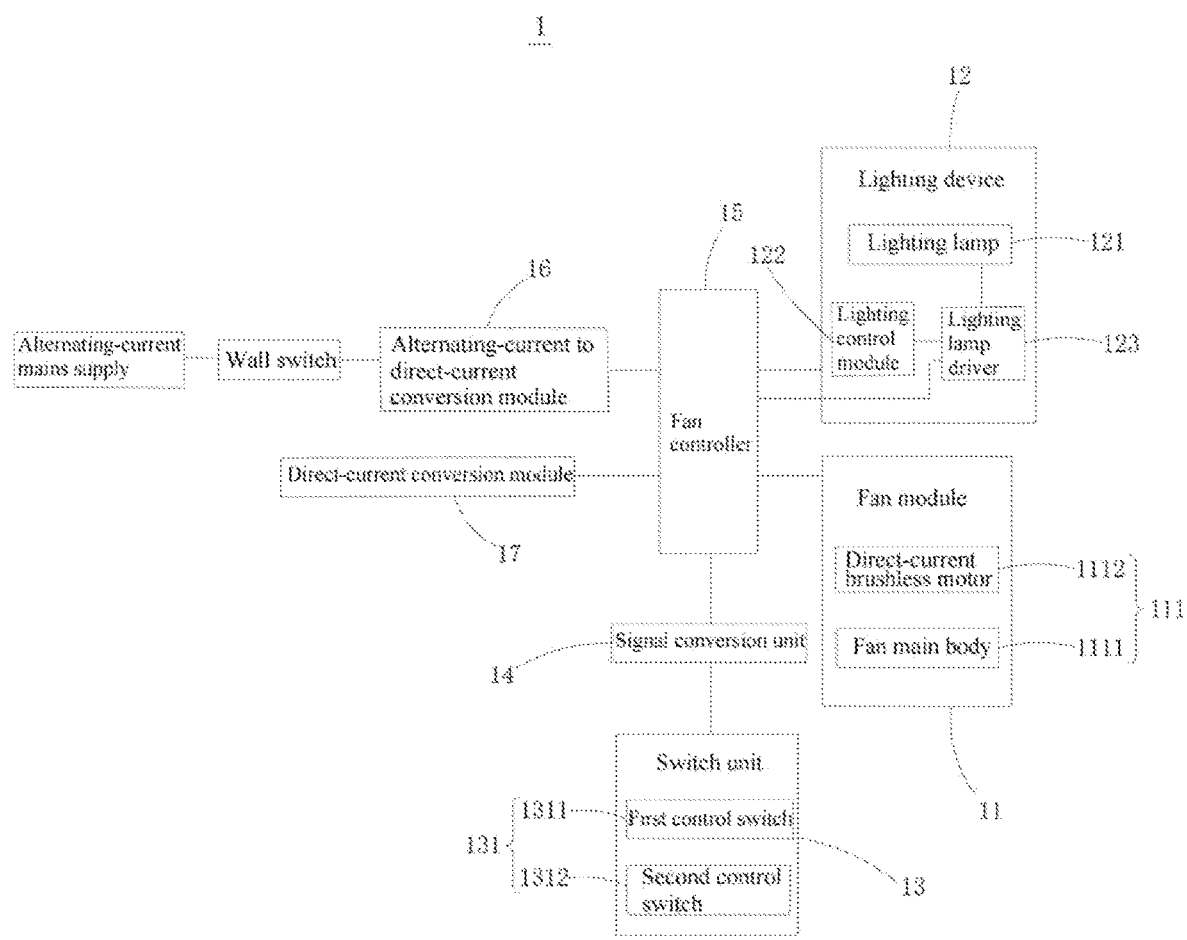
FIG. 1 is a circuit block diagram of a fan lamp according to one embodiment of the present disclosure.

In order to make the aim, technical scheme and advantages of the invention clearer, the following will be combined with the accompanying drawings of embodiments of the present disclosure, The technical scheme in the embodiment of the invention is clearly and completely described, Obviously, the described embodiments are part of the embodiments of the present disclosure, and not all embodiments are based on the embodiments of the present disclosure, and all other embodiments attained by those of ordinary skill in the art without inventive effort are within the scope of the present disclosure.

In the present disclosure, orientations or positional relationships indicated by the terms "upper", "lower", "left", "right", "front", "rear", "top", "bottom", "inner", "outer", "middle", "vertical", "horizontal", "transverse", "longitudinal", etc. are based on orientations or positional relationships shown in the drawings. These terms are mainly used to better describe the present disclosure and embodiments of the present disclosure, and are not used to limit that the indicated device, element, or component must have a specific orientation, or be constructed and operated in a specific orientation.

In addition, some of the above terms may be used to indicate other meanings in addition to the orientations or position relationships. For example, the term "upper" may also be used to indicate a certain dependence relationship or connection relationship in some cases. For those of ordinary skill in the art, the specific meanings of the above terms in the present disclosure can be understood according to specific situations.

In addition, the terms "install", "arrange", "provide", "connect" and "couple" should be understood broadly. For example, it can be a fixed connection, a detachable connection, an integral structure, a mechanical connection, an electrical connection, a direct connection, an indirect connection through an intermediate medium, or a communication between two devices, elements or components. For ordinary technical personnel in this field, the specific meanings of the above terms in present disclosure can be understood based on specific circumstances.

In addition, the terms "first", "second", etc., are used primarily to distinguish different devices, elements or components (the specific type and construction may be the same or different) and are not used to indicate or imply the relative importance or quantity of the indicated device, element or component. Unless otherwise stated, "plurality" means two or more.

In order to make the aims, technical solution and advantages of the present disclosure will be clearly, the present disclosure is further described below in combination with accompanying drawings and implementations.

Figure 2:
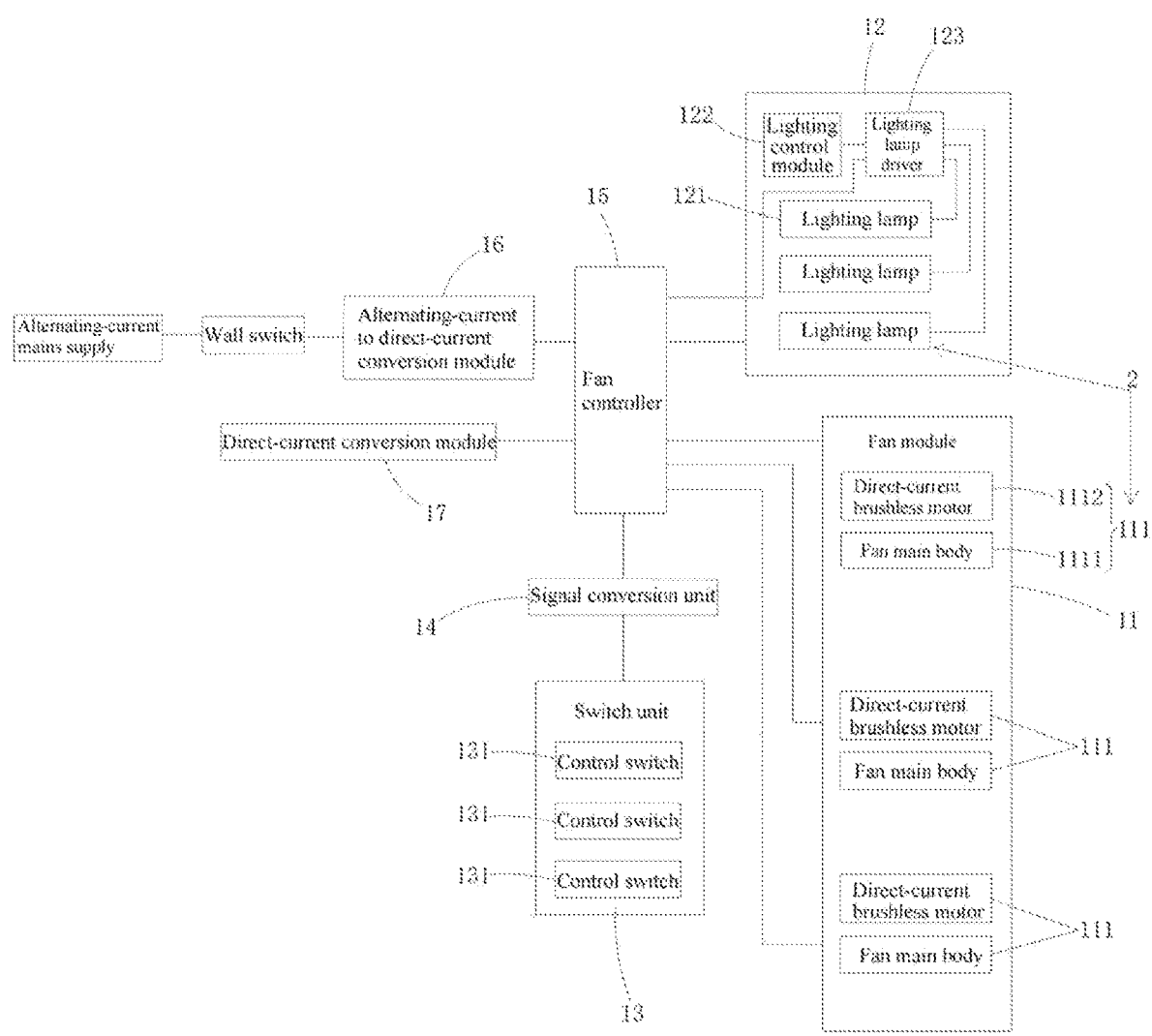
FIG. 2 is a circuit block diagram of a fan lamp according to another embodiment of the present disclosure.

Referring to FIG. 1 and FIG. 2, embodiments of the present disclosure provide a fan lamp 1. The fan lamp is hung on a ceiling for lighting and air supplying or air exhausting. Specifically, domestic alternating-current mains supply (which is external alternating current for the fan lamp) is provided to the fan lamp via a wall switch arranged on a wall. It can be understood that the alternating-current mains supply is supplied to the fan lamp, and the wall switch is operated by a user to control whether to provide the alternating-current mains supply to the fan lamp. Specifically, the fan lamp 1 includes:

a fan module 11, including at least one fan 111, wherein each of the fans 111 includes a fan main body 1111 and a direct-current brushless motor 1112; the direct-current brushless motor 1112 is connected to the fan main body 1111 and is configured to drive the fan main body 1111 to rotate;

a lighting module 12, including at least one lighting lamp 121;

a switch unit 13, including at least two control switches 131, wherein each of the control switches 131 is configured to be triggered to generate a corresponding switching signal;

a signal conversion unit 14, electrically connected to the switch unit 13 and configured to receive the switching signals of the at least two control switches 131 and generate corresponding digital control signals; and a fan lamp controller 15, electrically connected to the direct-current brushless motor 1112, the lighting lamp 121, and the signal conversion unit 14 and configured to receive the digital control signals, generate a fan driving signal and a lighting control signal according to the digital control signals, provide the fan driving signal to the direct-current brushless motor 1112 to control turning on, turning off, a rotating direction, a speed and/or rotation time of each of the fans 111, and provide the lighting control signal to the lighting module 12 to control turning on, turning off, brightness, a color temperature and/or lightening time of each of the lighting lamps 121.

Compared with the prior art, the fan lamp 1 of the above embodiment is as follows: Each of the fans 111 adopts the direct-current brushless motor 1112, so that the fan lamp has the advantages of low power consumption, small volume, light weight, high stability, and the like. Furthermore, the signal conversion unit 14 converts the switching signals of the control switches 131 into the digital control signals, so that the fan lamp controller 15 can control rotations of the fans 111 according to the digital control signals (for example, achieving control and a timer function of gears, clockwise rotations, and anticlockwise rotations of the fans). One-gear one-contact low current (for example, 250V0.1 A) is enough for the control switches 131 used, so the overall hardware cost of the control switches 131 is expected to be reduced by 50% or above. In this way, the mechanical and electrical performance life of the control switches 131 that control the fans can be effectively prolonged, for example, by 10 times (the control switches can be used for 500,000 times regularly). Similarly, for the lighting lamp portion, a traditional high-voltage mercury lamp is replaced with a light-emitting diode (LED). The signal conversion unit 14 converts the switching signals of the control switches 131 into the digital control signals, so that the fan lamp controller 15 can control the turning on, turning off, brightness, color temperatures and/or lightening time of the lighting lamps 121 according to the digital control signals. In this way, one-gear one-contact low current (for example, 250V0.1 A) is enough for the control switches 131 used by the lighting lamps 121, so the overall hardware cost of the control switches 131 is expected to be reduced by 50% or above. In this way, the mechanical and electrical performance life of the control switches 131 that control the lighting lamps 121 can be effectively prolonged, for example, by 10 times (the control switches can be used for 500,000 times regularly), so that the fan lamp has relatively high reliability.

As shown in FIG. 1, in this embodiment, a schematic description is mainly made by taking the following as an example: the at least two control switches 131 includes a first control switch 1311 and a second control switch 1312. The first control switch 1311 corresponds to one of the fans 111. The second control switch 1312 corresponds to one of the lighting lamps 121. The digital control signals include a first digital control signal and a second digital control signal. The signal conversion unit 14 is configured to convert the switching signal of the first control switch 1311 into the first digital control signal. The fan lamp controller 15 is configured to output the corresponding fan driving signal to the direct-current brushless motor 1112 of the corresponding fan 111 according to the first digital control signal. The signal conversion unit 14 is configured to convert the switching signal of the second control switch 1312 into the second digital control signal. The fan lamp controller 15 is configured to output the corresponding lighting control signal to the corresponding lighting lamp 121 according to the second digital control signal.

As shown in FIG. 2, in another embodiment, a quantity of the at least one fan 111 is at least two, for example, three. A quantity of the at least one lighting lamp 121 corresponds to the quantity of the at least one fan 111, for example, also three. Each of the fans 111 and the corresponding lighting lamp 121 form a fan lamp group 2. The at least one fan 111 and the at least one lighting module 121 form two fan lamp groups 2 (this embodiment is mainly explained by taking three fan lamp groups 2 as an example, but a specific quantity is not limited to the above). The digital control signals include at least two digital control sub-signals corresponding to the at least two fan lamp groups 2. The fan driving signal includes at least two fan driving sub-signals corresponding to the at least two fan lamp groups 2. The lighting control signal includes at least two lighting control sub-signals corresponding to the at least two fan lamp groups 2. The at least two control switches 131 respectively correspond to the at least two fan lamp groups 2. The signal conversion unit 14 is configured to convert the switching signal of each of the control switches 131 into the corresponding digital control sub-signal. The fan lamp controller 15 is configured to respectively output the corresponding fan driving sub-signals and the corresponding lighting control sub-signals to the corresponding fans 111 of the fan module 11 and the corresponding lighting lamps 121 of the lighting module according to the digital control sub-signals. That is, in the embodiment shown in FIG. 2, for each fan lamp group 2, the fan 111 and the lighting lamp 121 are simultaneously turned on or turned off. Of course, in some other embodiments, turning on and turning off can also be set according to an actual need. For example, it is set that the two fans 111 are simultaneously turned on, and the two lighting lamps 121 are simultaneously turned on.

Further, in all the above embodiments, the control switch 131 is one of a zipper switch 1313 and a touch switch 1314. Preferably, the control switch 131 may be the zipper switch 1313. It is convenient for a user to pull and use the zipper switch, and the reliability is relatively high. In one embodiment, when a triggering duration of the control switches 131 is shorter than first preset time, the switching signals generated by the control switches 131 are on signals or off signals, and the on signals and the off signals appear alternately; and when the triggering duration of the control switches 131 exceeds second preset time, the switching signals generated by the control switches 131 are signals used for controlling the rotating directions, speeds and/or rotation time of the corresponding fans 111, or signals used for controlling the brightness, the color temperatures and/or the lightening time of the corresponding lighting lamps 121. Specifically, the first preset time can be shorter than or equal to 0.1 second, that is, a short-time operation on the control switches 131 can correspondingly achieve a turning on or turning off operation. The second preset time can be longer than or equal to 2 seconds. That is, for the fans, a long-time operation on the control switches 131 can control the speeds, rotating directions, or fan timers of the fans 111. For the lighting lamps 121, the control switches 131 can control the brightness, color temperatures, or lighting timers of the lighting lamps 121. Further, it can be understood as follows: The user can also set third preset time, for example, 4 seconds or longer, so that a switching signal with operation time of 2 seconds to 4 seconds and a switching signal with operation time of 4 seconds or longer can control different functions, for example, respectively controlling the speeds and timers of the fans 111, or respectively controlling the brightness and timers of the lighting lamps 121. It can be understood, "zipper switch" can a type of pull switch, but a pulling wire is replaced by a zipper wire including a plurality of teeth.

Figure 6:
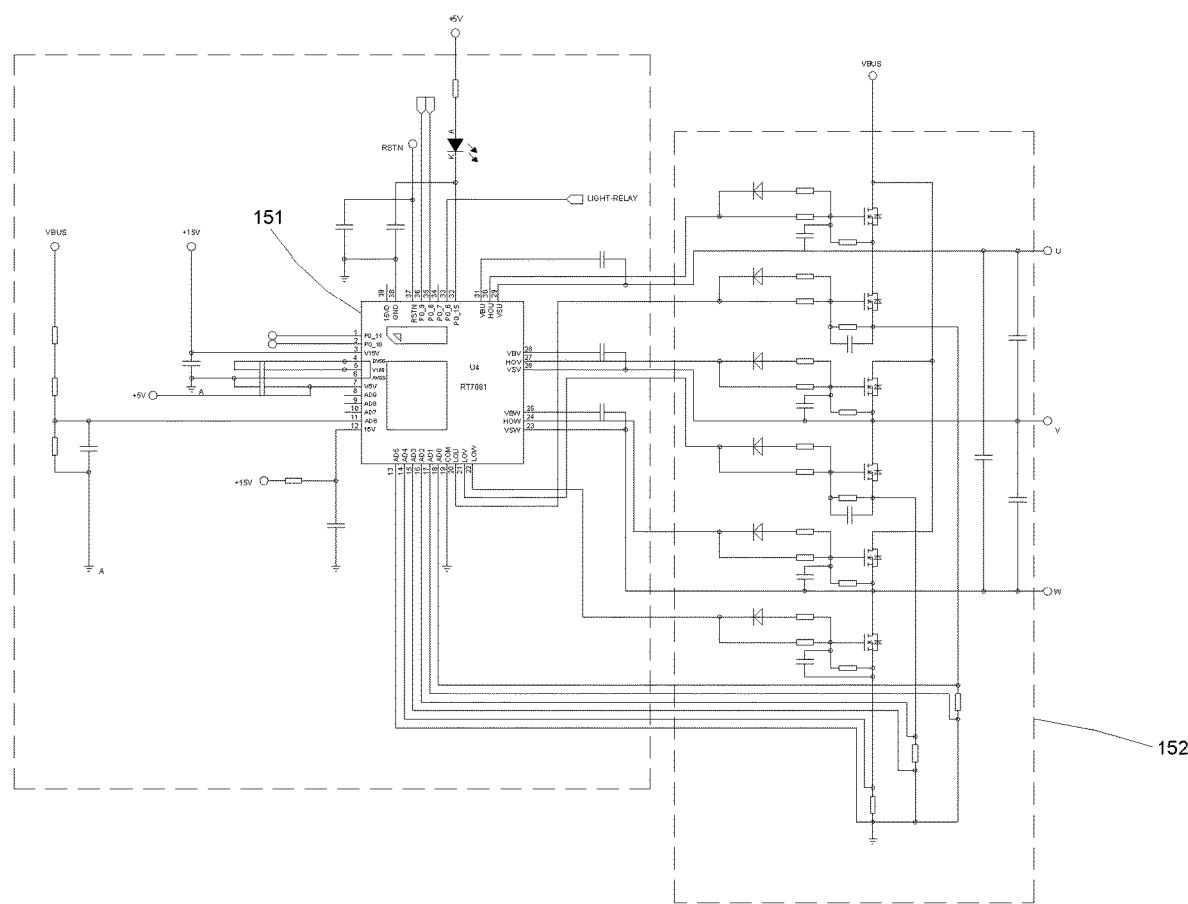
FIG. 6 is a circuit diagram of a fan lamp controller of a fan lamp according to one embodiment of the present disclosure.

Further, as shown in FIG. 1 and FIG. 2, the fan lamp 1 further includes an alternating-current to direct-current conversion module 16 and a direct-current conversion module 17. The fan lamp controller 15 includes a main control module 151 and a three-phase driving circuit 152. The alternating-current to direct-current conversion module 16 is configured to receive an external direct current and convert the alternating current into a first direct-current voltage. The direct-current conversion module 17 is electrically connected to the alternating-current to direct-current conversion module 16 and the main control module 151. The direct-current conversion module 17 is configured to convert the first direct-current voltage into a second direct-current voltage. The first direct-current voltage and the second direct-current voltage are provided to the main control module 151. The main control module 151 is electrically connected to the signal conversion unit 14 to receive the digital control signals. The fan driving signals include three fan driving sub-signals. The three-phase driving circuit 18 is electrically connected between the main control module 151 and the direct-current brushless motor 1112. The main control module 151 is configured to output a three-phase control signal to the three-phase driving circuit 18 according to the digital control signals, so that the three-phase driving circuit 18 outputs the three fan driving sub-signals respectively to three receiving terminals U, V, and W of the direct-current brushless motor 1112. It can be understood that as shown in FIG. 6, the main control module 151 of the fan lamp controller 15 is electrically connected to the direct-current brushless motor 1112 through the three-phase driving circuit 18. However, in other modified embodiments, the main control module 151 of the fan lamp controller 15 can also be internally integrated with a three-phase driving circuit 18, and the main control module 151 has three terminals that can directly output three fan driving sub-signals to the direct-current brushless motor 1112.

Figure 3:
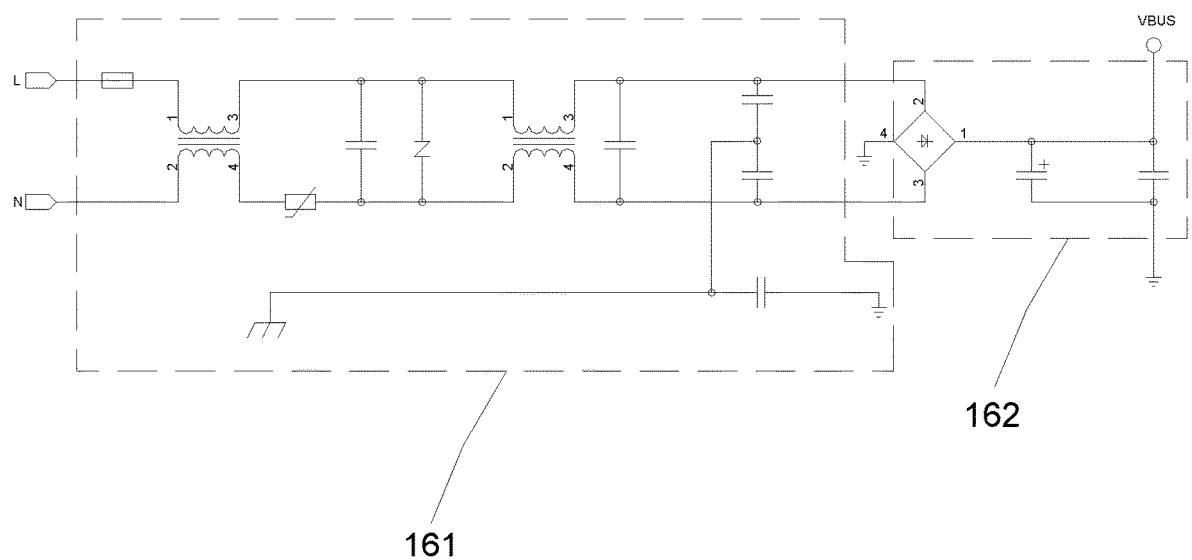
FIG. 3 is a circuit diagram of an alternating-current to direct-current conversion module of a fan lamp according to one embodiment of the present disclosure.

Further, as shown in FIG. 3, the alternating-current to direct-current conversion module 16 includes a common mode anti-interference module 161 and a rectification module 162. The external alternating current is alternating-current mains supply. The common mode anti-interference module 161 is configured to perform anti-interference treatment on the alternating-current mains supply to improve electromagnetic interference. The alternating-current mains supply with improved electromagnetic interference is provided to the rectification module 162. The rectification module 162 is configured to convert the alternating-current mains supply into the first direct-current voltage. It can be understood that the stability and reliability of an output signal of the alternating-current to direct-current conversion module 16 can be improved through the common mode anti-interference module 161.

Figure 5:
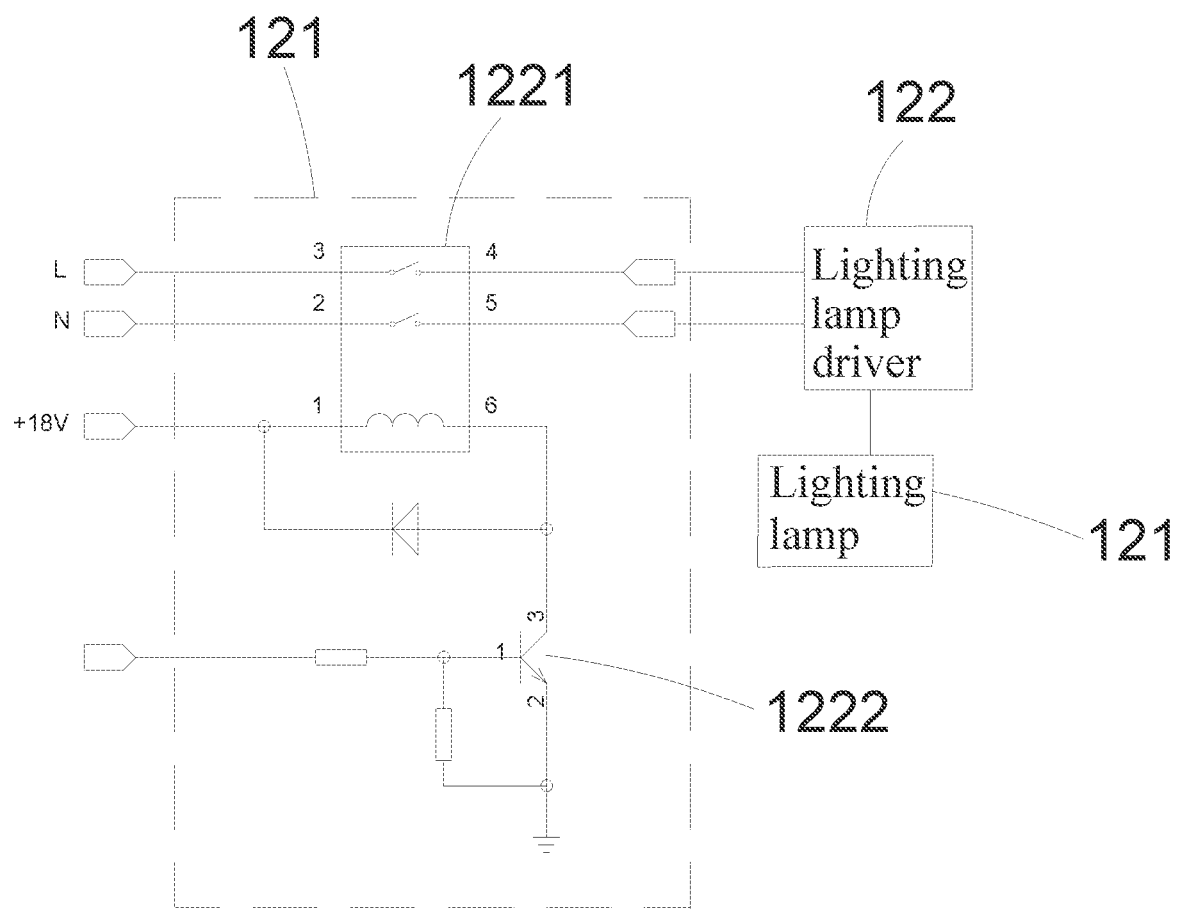
FIG. 5 is a circuit diagram of a lighting control module of a fan lamp according to one embodiment of the present disclosure.

Further, as shown in FIG. 5, the lighting module 12 further includes a lighting control module 122 and a lighting lamp driver 123. The lighting control module 122 is electrically connected to the fan lamp controller 15 and is configured to provide the external alternating current to the lighting lamp driver 123 under the control of the fan lamp controller 15. The lighting lamp driver 123 is electrically connected to the fan lamp controller 15, the lighting lamps 121, and the lighting control module 122, so as to receive the lighting lamp control signals and the external alternating current to output lighting driving signals to control the turning on, turning off, brightness, color temperatures and/or lightening time of the lighting lamps 121. The lighting control module 122 includes a relay 1221 and a lighting switch 1222. Two input ends of the relay 1221 are configured to receive the external alternating current. Two output ends of the relay 1221 are configured to output the external alternating current to the lighting lamp driver 123. A power end of the relay 1221 receives a working voltage. A ground end of the relay 1221 is grounded via two conducting ends of the lighting switch 1222. A control end of the relay 1221 is electrically connected to the fan lamp controller 15. It can be understood that the lighting control module 122 can also replace the above wall switch on the wall or be additionally arranged on the fan lamp or the wall to achieve lighting on-off control. In this embodiment, the lighting switch 1222 can be an NPN type bipolar transistor.

Figure 4:
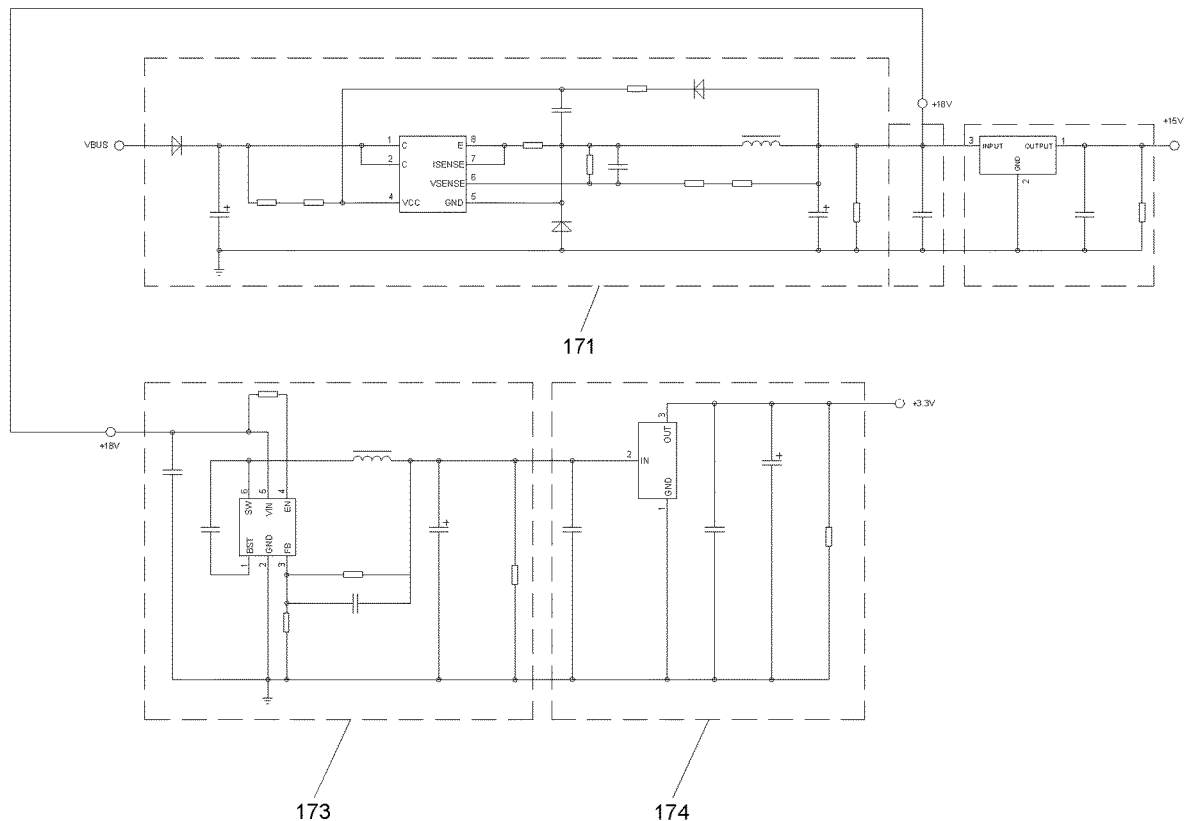
FIG. 4 is a circuit diagram of a direct-current conversion module of a fan lamp according to one embodiment of the present disclosure.

Further, as shown in FIG. 4, the direct-current conversion module 17 includes a first conversion unit 171 and a second conversion unit 172. The first conversion unit 171 is connected between the alternating-current to direct-current conversion module 16 and the second conversion unit 172. The second conversion unit 172 is connected between the first conversion unit 171 and the main control module 151. The first conversion unit 171 is configured to convert the first direct-current voltage into a third direct-current voltage. The second conversion unit 172 is configured to convert the third direct-current voltage into the second direct-current voltage. The direct-current conversion module 17 further includes a third conversion unit 173 and the fourth conversion unit 174. The third conversion unit 173 is connected between the first conversion unit 171 and the fourth conversion unit 174. The third conversion unit 173 is configured to convert the third direct-current voltage into a fourth direct-current voltage. The fourth conversion unit 174 is configured to convert the fourth direct-current voltage into a fifth direct-current voltage. The second direct-current voltage is 15 V; the third direct-current voltage is 18 V; the fourth direct-current voltage is 5 V; and the fifth direct-current voltage is 3.3 V. It can be understood that a plurality of different direct-current voltages can be obtained through the four conversion units 171 to 174 of the direct-current conversion module 17 and are used by different circuits or chips.

Figure 7:
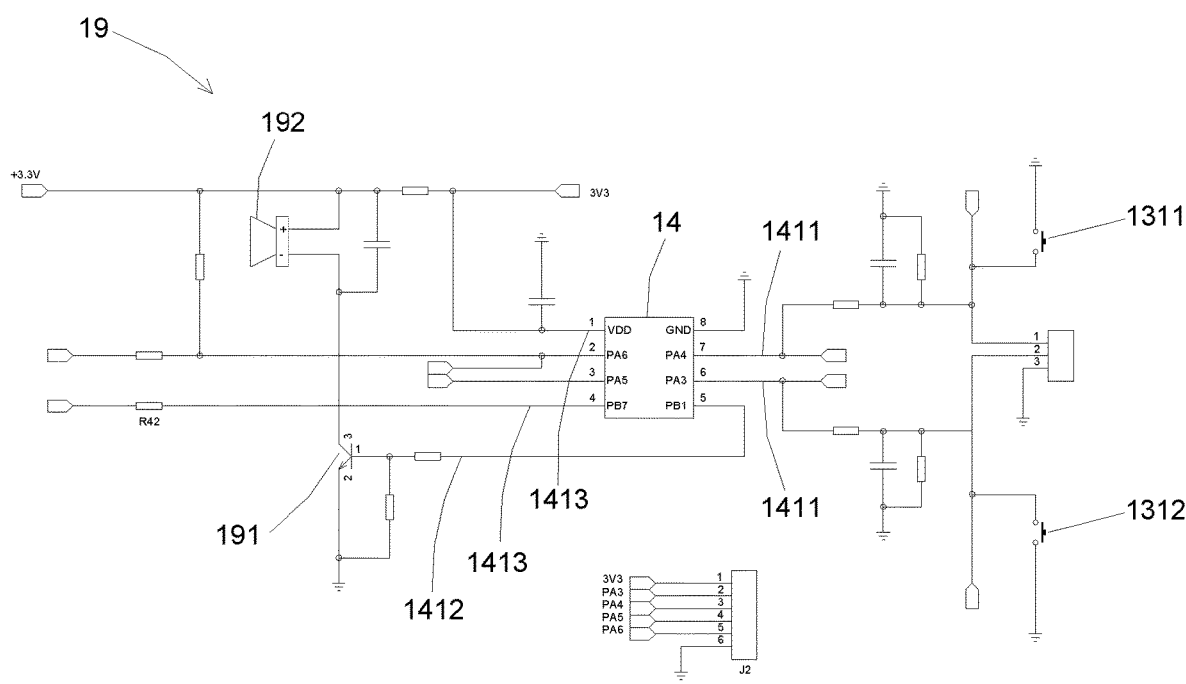
FIG. 7 is a circuit diagram of a signal conversion unit and an operation feedback unit of a fan lamp according to one embodiment of the present disclosure.

Further, as shown in FIG. 7, the signal conversion unit 14 includes a control chip 141. The control chip 141 includes a power end VDD, a ground end GND, at least two switching signal receiving ends 1411, and a digital control signal output end 1413. The at least two switching signal receiving ends 1411 correspond to the at least two control switches 131. Each switching signal receiving end 1411 is configured to receive the switching signal of the corresponding control switch 131. The digital control signal output end 1413 is configured to output the digital control signals. The power end VDD and the ground end GND are respectively configured to receive the working voltage and be grounded. The fan lamp 1 further includes an operation feedback unit 19. The operation feedback unit 19 is configured to send a feedback signal to make a feedback on operations received by the control switches 131. The operation feedback unit 19 includes a switch element 191 and a signal feedback element 192. The signal feedback element 192 includes a buzzer or an indicator. The control chip 141 further includes an operation feedback control end 1412. The switch element 191 and the signal feedback element 192 are connected in series to form a series branch. One end of the series branch is configured to receive the working voltage, and the other end of the series branch is configured to be grounded. A control end of the switch element 191 is electrically connected to the operation feedback control end 1412. The switch element 191 can also be an NPN type bipolar transistor. The signal feedback element 192 can provide the user with an operation feedback, thereby achieving a better user experience. In this embodiment, an explanation is made by mainly taking the following as an example: the signal feedback element 192 includes the buzzer. It can be understood that the buzzer has a better reminding effect, and there is no need to constantly check the buzzer, so that the user experience is better.

The signal conversion unit 14 can be a switch encoder. The main control module 151 can be a micro control unit (MCU). The main control module 151 can be provided with a plurality of input/output ports (IO ports). The control chip 141 of the switch encoder can be directly connected to the IO ports to output the digital control signals, so that start, stop, speed adjustment, clockwise rotation, anticlockwise rotation, scene control (for example, a timer), and other actions of the direct-current brushless motor 1112 are controlled using analog or digital signals of low-current low voltages. In the same way, the turning on, turning off, dimming, color adjustment, scene control (for example, timer), and other actions of the lighting lamps such as LEDs can also be controlled using digital signals. The control switches 131 adopt the Zipper switchs 1313 or the touch switches 1314, which are controlled using the analog or digital signals of the low-current low voltage. Each switch only needs one closed contact. Each control switch 131 can perform function or scene control since independent IO address codes allocated by the switch encoder and the main control module 151 of the fan lamp controller 15 correspond to different motor numbers or lighting lamp numbers, so that implementation is simple and convenient, and the costs are low.

The various above embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure.

What is claimed is:

1. A fan lamp, wherein the fan lamp comprises:
   a fan module, comprising at least two fans, wherein each of the fans comprises a fan main body and a direct-current brushless motor; the direct-current brushless motor is connected to the fan main body and is configured to drive the fan main body to rotate;
   a lighting module, comprising at least two lighting lamps;
   a switch unit, comprising at least two control switches, wherein each of the control switches is configured to be triggered to generate a corresponding switching signal;
   a signal conversion unit, electrically connected to the switch unit and configured to receive the switching signals of the at least two control switches and generate corresponding digital control signals; and
   a fan lamp controller, electrically connected to the direct-current brushless motor, the lighting lamp, and the signal conversion unit and configured to receive the digital control signals, generate a fan driving signal and a lighting control signal according to the digital control signals, provide the fan driving signal to the direct-current brushless motor to control turning on, turning off, a rotating direction, a speed and/or rotation time of each of the fans, and provide the lighting control signal to the lighting module,
   wherein the lighting module further comprises a lighting control module and a lighting lamp driver; the lighting control module is electrically connected to the fan lamp controller and is configured to provide external alternating current to the lighting lamp driver under the control of the fan lamp controller; the lighting lamp driver is electrically connected to the fan lamp controller, the lighting lamps, and the lighting control module, so as to receive the lighting lamp control signals and the external alternating current to output lighting driving signals to control the turning on, turning off, brightness, color temperatures and/or lightening time of the lighting lamps;
   wherein each of the fans and the corresponding lighting lamp form a fan lamp group; the at least two fans and the at least two lighting lamps form two fan lamp groups; the digital control signals comprise at least two digital control sub-signals corresponding to the at least two fan lamp groups; the fan driving signal comprises at least two fan driving sub-signals corresponding to the at least two fan lamp groups; the lighting control signal comprises at least two lighting control sub-signals corresponding to the at least two fan lamp groups; the at least two control switches respectively correspond to the at least two fan lamp groups; the signal conversion unit is configured to convert the switching signal of each of the control switches into the corresponding digital control sub-signal; and the fan lamp controller is configured to respectively output the corresponding fan driving sub-signal and the corresponding lighting control sub-signal to the corresponding fan and the corresponding lighting lamp of the lighting module according to the digital control sub-signal.

2. The fan lamp according to claim 1, wherein the at least two control switches comprise a first control switch and a second control switch; the first control switch corresponds to one of the fans; the second control switch corresponds to one of the lighting lamps; the digital control signals comprise a first digital control signal and a second digital control signal; the signal conversion unit is configured to convert the switching signal of the first control switch into the first digital control signal; the fan lamp controller is configured to output the corresponding fan driving signal to the direct-current brushless motor of the corresponding fan according to the first digital control signal; the signal conversion unit is configured to convert the switching signal of the second control switch into the second digital control signal; and the fan lamp controller is configured to output the corresponding lighting control signal to the corresponding lighting lamp according to the second digital control signal.

3. The fan lamp according to claim 1, wherein the control switch is one of a pull-chain operator and a touch switch.

4. The fan lamp according to claim 1, wherein the fan lamp further comprises an alternating-current to direct-current conversion module and a direct-current conversion module; the fan lamp controller comprises a main control module and a three-phase driving circuit; the alternating-current to direct-current conversion module is configured to receive an external direct current and convert the alternating current into a first direct-current voltage; the direct-current conversion module is electrically connected to the alternating-current to direct-current conversion module and the main control module; the direct-current conversion module is configured to convert the first direct-current voltage into a second direct-current voltage; the first direct-current voltage and the second direct-current voltage are provided to the main control module; the main control module is electrically connected to the signal conversion unit to receive the digital control signals; the fan driving signals comprise three fan driving sub-signals; the three-phase driving circuit is electrically connected between the main control module and the direct-current brushless motor; and the main control module is configured to output a three-phase control signal to the three-phase driving circuit according to the digital control signals, so that the three-phase driving circuit outputs the three fan driving sub-signals respectively to three receiving terminals of the direct-current brushless motor.

5. The fan lamp according to claim 4, wherein the alternating-current to direct-current conversion module comprises a common mode anti-interference module and a rectification module; the external alternating current is alternating-current mains supply; the common mode anti-interference module is configured to perform anti-interference treatment on the alternating-current mains supply to improve electromagnetic interference; the alternating-current mains supply with improved electromagnetic interference is provided to the rectification module; and the rectification module is configured to convert the alternating-current mains supply into the first direct-current voltage.

6. The fan lamp according to claim 4, wherein the lighting control module comprises a relay and a lighting switch; two input ends of the relay are configured to receive the external alternating current; two output ends of the relay are configured to output the external alternating current to the lighting lamp driver; a power end of the relay receives a working voltage; a ground end of the relay is grounded via two conducting ends of the lighting switch; and a control end of the relay is electrically connected to the fan lamp controller.

7. The fan lamp according to claim 4, wherein the direct-current conversion module comprises a first conversion unit and a second conversion unit; the first conversion unit is connected between the alternating-current to direct-current conversion module and the second conversion unit; the second conversion unit is connected between the first conversion unit and the main control module; the first conversion unit is configured to convert the first direct-current voltage into a third direct-current voltage; the second conversion unit is configured to convert the third direct-current voltage into the second direct-current voltage; the direct-current conversion module further comprises a third conversion unit and the fourth conversion unit; the third conversion unit is connected between the first conversion unit and the fourth conversion unit; the third conversion unit is configured to convert the third direct-current voltage into a fourth direct-current voltage; the fourth conversion unit is configured to convert the fourth direct-current voltage into a fifth direct-current voltage; the second direct-current voltage is 15 V; the third direct-current voltage is 18 V; the fourth direct-current voltage is 5 V; and the fifth direct-current voltage is 3.3 V.

8. The fan lamp according to claim 4, wherein the signal conversion unit comprises a control chip; the control chip comprises a power end VDD, a ground end GND, at least two switching signal receiving ends, and a digital control signal output end; the at least two switching signal receiving ends correspond to the at least two control switches; each switching signal receiving end is configured to receive the switching signal of the corresponding control switch; the digital control signal output end is configured to output the digital control signals; the power end VDD and the ground end GND are respectively configured to receive the working voltage and be grounded; the fan lamp further comprises an operation feedback unit; the operation feedback unit is configured to send a feedback signal to make a feedback on operations received by the control switches; the operation feedback unit comprises a switch element and a signal feedback element; the signal feedback element comprises a buzzer or an indicator; the control chip further comprises an operation feedback control end; the switch element and the signal feedback element are connected in series to form a series branch; one end of the series branch is configured to receive the working voltage; the other end of the series branch is configured to be grounded; and a control end of the switch element is electrically connected to the operation feedback control end.

9. A fan lamp controller, applied to a fan lamp, wherein the fan lamp comprises a fan module, a lighting module, a switch unit, and a signal conversion unit; the fan module comprises at least two fans; each of the fans comprises a fan main body and a direct-current brushless motor; the direct-current brushless motor is connected to the fan main body and is configured to drive the fan main body to rotate; the lighting module comprises at least two lighting lamps; the switch unit comprises at least two control switches; each of the control switches is configured to be triggered to generate a corresponding switching signal; the signal conversion unit is electrically connected to the switch unit and configured to receive the switching signals of the at least two control switches and generate corresponding digital control signals; and the fan lamp controller is electrically connected to the direct-current brushless motor, the lighting lamp, and the signal conversion unit and configured to receive the digital control signals, generate a fan driving signal and a lighting control signal according to the digital control signals, provide the fan driving signal to the direct-current brushless motor to control turning on, turning off, a rotating direction, a speed and/or rotation time of each of the fans, and provide the lighting control signal to a lighting lamp driver of the lighting module to control turning on, turning off, brightness, a color temperature and/or lightening time of each of the lighting lamps, wherein the fan lamp further comprises an alternating-current to direct-current conversion module and a direct-current conversion module; the fan lamp controller comprises a main control module and a three-phase driving circuit; the alternating-current to direct-current conversion module is configured to receive an external direct current and convert alternating current into a first direct-current voltage; the direct-current conversion module is electrically connected to the alternating-current to direct-current conversion module and the main control module; the direct-current conversion module is configured to convert the first direct-current voltage into a second direct-current voltage; the first direct-current voltage and the second direct-current voltage are provided to the main control module; the main control module is electrically connected to the signal conversion unit to receive the digital control signals; the fan driving signals comprise three fan driving sub-signals; the three-phase driving circuit is electrically connected between the main control module and the direct-current brushless motor; and the main control module is configured to output a three-phase control signal to the three-phase driving circuit according to the digital control signals, so that the three-phase driving circuit outputs the three fan driving sub-signals respectively to three receiving terminals of the direct-current brushless motor.

10. The fan lamp according to claim 9, wherein the alternating-current to direct-current conversion module comprises a common mode anti-interference module and a rectification module; the external alternating current is alternating-current mains supply; the common mode anti-interference module is configured to perform anti-interference treatment on the alternating-current mains supply to improve electromagnetic interference; the alternating-current mains supply with improved electromagnetic interference is provided to the rectification module; and the rectification module is configured to convert the alternating-current mains supply into the first direct-current voltage.

11. The fan lamp according to claim 9, wherein the lighting module further comprises a lighting control module and a lighting lamp driver; the lighting control module is electrically connected to the fan lamp controller and is configured to provide the external alternating current to the lighting lamp driver under the control of the fan lamp controller; the lighting lamp driver is electrically connected to the fan lamp controller, the lighting lamps, and the lighting control module, so as to receive the lighting lamp control signals and the external alternating current to output lighting driving signals to control the turning on, turning off, brightness, color temperatures and/or lightening time of the lighting lamps; the lighting control module comprises a relay and a lighting switch; two input ends of the relay are configured to receive the external alternating current; two output ends of the relay are configured to output the external alternating current to the lighting lamp driver; a power end of the relay receives a working voltage; a ground end of the relay is grounded via two conducting ends of the lighting switch; and a control end of the relay is electrically connected to the fan lamp controller.

12. The fan lamp according to claim 9, wherein the direct-current conversion module comprises a first conversion unit and a second conversion unit; the first conversion unit is connected between the alternating-current to direct-current conversion module and the second conversion unit; the second conversion unit is connected between the first conversion unit and the main control module; the first conversion unit is configured to convert the first direct-current voltage into a third direct-current voltage; the second conversion unit is configured to convert the third direct-current voltage into the second direct-current voltage; the direct-current conversion module further comprises a third conversion unit and the fourth conversion unit; the third conversion unit is connected between the first conversion unit and the fourth conversion unit; the third conversion unit is configured to convert the third direct-current voltage into a fourth direct-current voltage; the fourth conversion unit is configured to convert the fourth direct-current voltage into a fifth direct-current voltage; the second direct-current voltage is 15 V; the third direct-current voltage is 18 V; the fourth direct-current voltage is 5 V; and the fifth direct-current voltage is 3.3 V.

13. The fan lamp according to claim 9, wherein the signal conversion unit comprises a control chip; the control chip comprises a power end VDD, a ground end GND, at least two switching signal receiving ends, and a digital control signal output end; the at least two switching signal receiving ends correspond to the at least two control switches; each switching signal receiving end is configured to receive the switching signal of the corresponding control switch; the digital control signal output end is configured to output the digital control signals; the power end VDD and the ground end GND are respectively configured to receive the working voltage and be grounded; the fan lamp further comprises an operation feedback unit; the operation feedback unit is configured to send a feedback signal to make a feedback on operations received by the control switches; the operation feedback unit comprises a switch element and a signal feedback element; the signal feedback element comprises a buzzer or an indicator; the control chip further comprises an operation feedback control end; the switch element and the signal feedback element are connected in series to form a series branch; one end of the series branch is configured to receive the working voltage; the other end of the series branch is configured to be grounded; and a control end of the switch element is electrically connected to the operation feedback control end.

* * * * *